W. WEYDEN.
AUTOMOBILE.
APPLICATION FILED JUNE 29, 1915.
1,166,288. Patented Dec. 28, 1915.
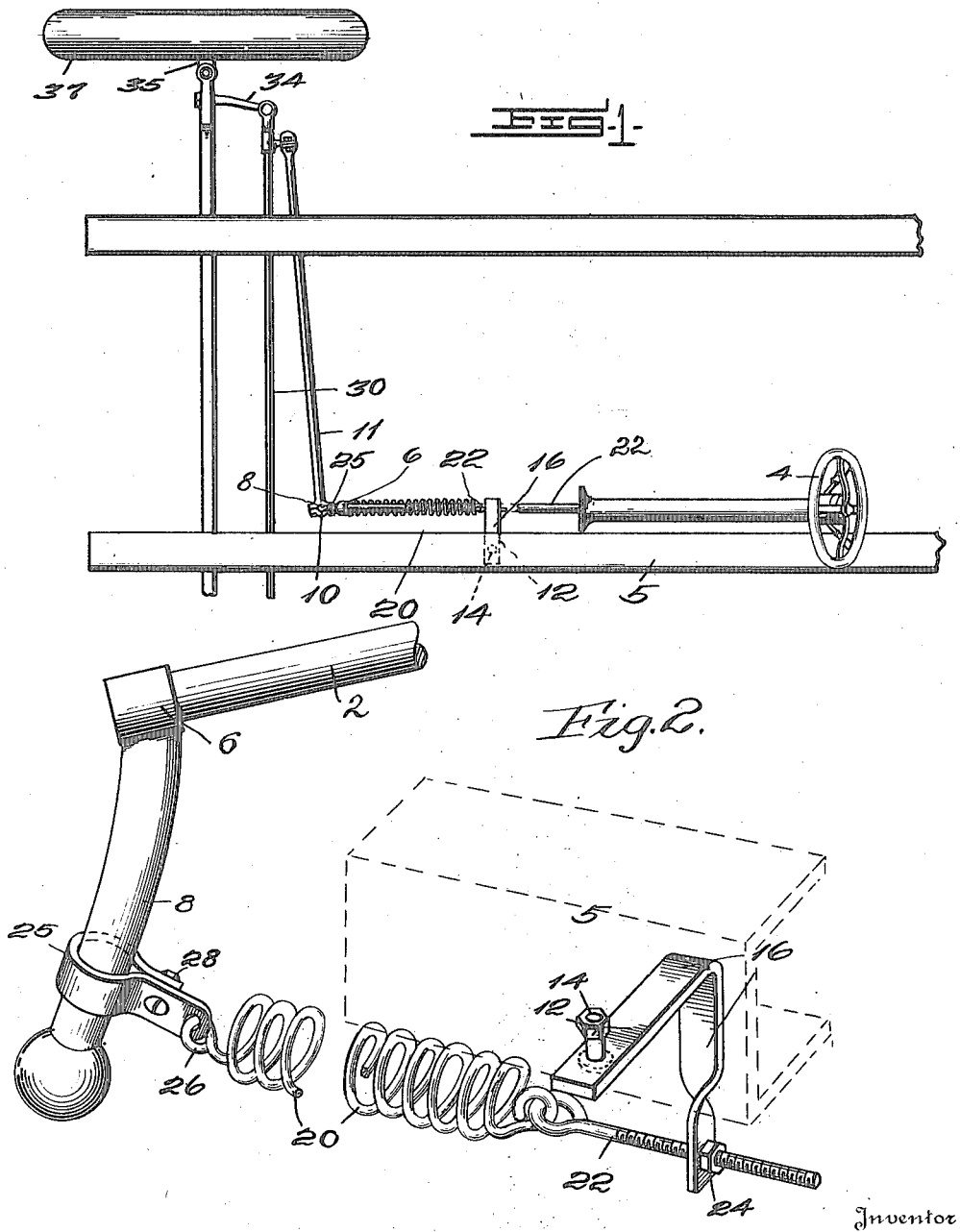

UNITED STATES PATENT OFFICE.

WILLIAM WEYDEN, OF LORE, IOWA, ASSIGNOR TO CHESTER A. WHITE, OF DUBUQUE, IOWA.

AUTOMOBILE.

1,166,288.     Specification of Letters Patent.     Patented Dec. 28, 1915.

Application filed June 29, 1915. Serial No. 36,939.

*To all whom it may concern:*

Be it known that I, WILLIAM WEYDEN, a citizen of the United States, residing at Lore, in the county of Dubuque and State of Iowa, have invented certain new and useful Improvements in Automobiles, of which the following is a specification.

My invention relates to automobiles, with special reference to means for controlling the steering mechanism, and the object is to automatically take up the lost motion between the steering wheels and the road wheels and keep the road wheels in perfect alinement.

Further object is to so assist the chauffeur that he may have a quicker and more perfect control of his car especially when traveling over rough, muddy, sandy or stony roads.

It essentially consists in securing a bracket to the base of the car and connecting it by a spring with the steering rod at or near its lower end.

Figure 1 is a top plan view of the steering gear of an automobile with my attachment in position. Fig. 2 is a perspective view of the attachment removed.

Referring to the drawings 2 designates the steering rod, 4 the steering wheel and 5 the base of the car. To the lower end of the rod 2 at 6 is rigidly attached a steering rod arm 8 which arm is jointed to a steering connecting rod 11 at 10. To the base 5 of the car is secured a bracket 12 by a nut and bolt 14. It securely bolts the arm 16 to the base of the car. The bracket hangs down perpendicularly and to it is attached a spring 20 by a screw 22 which passes through the bracket 12 and is provided with a nut 24 on each side of the bracket, for the purpose of adjusting the tension of the spring 20. The other end of the spring is formed into a ring 26 and is attached to the arm 8 by a loop 25 which loop is held closed by a bolt and nut 28. A spindle arm connecting rod 30 has its ends pivoted to levers 34 duplicate at both sides of the vehicle and one not being shown. The levers are connected to spindle axles 35 near each wheel 37 and to this bar, at one end is attached the steering connecting rod 11 and the opposite end of said rod is connected to the arm 8 at 10.

The manner of operating this device is substantially as follows: The operator grasps the wheel 4 and turns it in the direction he desires and that turns the wheels 37 in the usual manner by the engagement of the arm with the rod 11 operating the spindle arm connecting rod 30. If the steering wheel 4 is turned in one direction that will turn the arm 8 and as soon as the arm 8 commences to turn, the spring 20 will come into action and endeavor to bring back the arm to its normal position and this would tend to bring the wheels to normal position and if the wheel 4 is turned in the opposite direction the spring 20 will again come into action, and bring the wheels back to normal position, and hence the lost motion between the steering wheel and the road wheel will be taken up by the spring 20, and have a tendency to always keep the wheels in alinement. If it is desired to increase or decrease the tension of the spring 20, then the operator moves the screw 24 to adapt it to such tension as desired. It will be seen by this mode of attaching the spring directly to the steering rod and the manner in which it operates, that the front wheels of the car are constantly being drawn back toward normal position and if one of the wheels strikes a stone or uneven road then the spring will relieve the jar upon the wheel 4 and relieves the operator from the injury to his nerves attendant upon such jar and will have a tendency at all times to hold the wheels of a car in a direct line.

Having now described my invention what I claim is,

A controlling device for use with steering mechanism including a steering rod having a radiating arm, said controlling device including a loop removably secured rigidly to the radiating arm adjacent its free terminal, a bracket removably secured rigidly to the car frame remote from the loop, a screw having adjustable connection with the bracket, and a spring terminally connecting the loop and screw.

In testimony whereof I affix my signature in presence of two witnesses.

WILLIAM WEYDEN.

Witnesses:
  M. M. CADY,
  FERD FITTGATHER.